United States Patent [19]

Conkle

[11] 4,051,588
[45] Oct. 4, 1977

[54] MACHINE FOR DISASSEMBLING WOOD PALLETS

[76] Inventor: Neil E. Conkel, 1000 Clarendon, Columbus, Ohio 43223

[21] Appl. No.: 636,932

[22] Filed: Dec. 2, 1975

[51] Int. Cl.² .............................................. B23P 19/04
[52] U.S. Cl. ................................... 29/252; 29/200 D
[58] Field of Search ................. 29/252, 244, 254, 251, 29/239, 200 D

[56] References Cited

U.S. PATENT DOCUMENTS

| 3,846,890 | 11/1974 | Bielkiewicz | 29/200 D |
| 3,869,783 | 3/1975 | Spencer | 29/252 |
| 3,916,498 | 11/1975 | Lopez et al. | 29/252 |

*Primary Examiner*—Gary L. Smith
*Assistant Examiner*—Roscoe V. Parker

*Attorney, Agent, or Firm*—Cennamo, Kremblas & Foster

[57] ABSTRACT

A machine for disassembling damaged pallets of the wood type. The pallet is machine disassembled in a manner wherein the undamaged board or stringers may again be used in a reassembled pallet. The machine includes a platform having means for retaining the manually placed pallet in a fixed lateral position and a plate positionable on the deck side of the wood pallet for retention of the pallet in a vertical position. A hydraulically driven engaging arm is positioned above the platform to engage the stringer longitudinally and in a lateral direction. The arm is moved horizontally from a first, second, or third position to forceably engage one, two, or all three stringers. The retaining means assures that no additional damage is imparted to the slats or spacers.

6 Claims, 5 Drawing Figures

MACHINE FOR DISASSEMBLING WOOD PALLETS

BACKGROUND

Pallets of the wood type have found extensive use in commerce for transporting boxed, crated, or bagged loads from one position to another. The pallets being lifted and dropped from place to place are subjected to rough handling by the lift truck and otherwise. The damage evidences itself in cracked or destroyed baseboards, deckboards or the stringers. It has been found however, that in almost every instance several of the boards may be salvaged and in certain instances stringers may be salvaged.

Wood pallets are generally made of oak or a similar hardwood. In view of the wood aging process and used pallet wood is more valuable than the non-used wood—seasoned versus green lumber. Accordingly, it has been found to be profitable to disassemble the damaged wood pallets, salvage the undamaged lumber, and to reconstruct the pallet from the used lumber. The resulting wood pallet is as good or perhaps better than a newly constructed pallet. However the disassembling has heretofore been primarily by hand which in turn is laborous, time consuming, and costly.

SUMMARY OF INVENTION

The machine of the present invention is operational to disassemble a wood pallet in a manner wherein the undamaged lumber may be salvaged. The machine in its most basic form comprises structure having a platform for resting a pallet thereon. The platform comprises an abutment that restricts the movement of the platform in a lateral or horizontal direction. The structure also includes a plate movably downward to engage the flat deck surface of the pallet and hence restrict the pallet in its vertical movement. Displaced above the platform at a height intermediate the stringer of the pallet is an elongated engaging arm. The arm is initially positioned opposite to that of the aforesaid abutment on the platform. The arm, in operation of disassembling the pallet, is hydraulically moved laterally across the platform. The arm engages the first stringer and in continuing its movement separates the stringer from the upper and base boards. The arm continues in its movement until the second and third stringer are similarly removed from the upper and base boards. The upper plate is then lifted and the separated boards and stringers are removed for salvaging.

If upon inspection it is determined that one or two stringers are in good condition and the upper and base boards are in good condition, the one or two damaged stringers only are removed. This is accomplished by moving the engaging arm laterally to a position adjacent the first stringer desired to be removed. The remainder of the operation is the same.

OBJECTS

It is accordingly a principal object of the present invention to provide a new and improved machine operable to disassemble wood pallets by separating the stringers from the upper and base boards and in a manner that is efficient, relatively simple, and without further damage to the lumber.

Another object of the present invention is to retain in position the stringers that are not damaged.

Other objects and features of the present invention will become apparent from the following detailed description when taken in conjunction with the drawings in which:

DETAILED DESCRIPTION OF THE DRAWINGS

Figure 1:
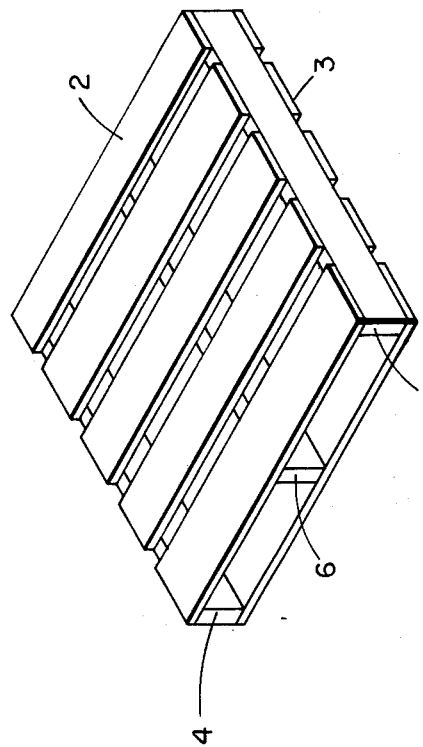
FIG. 1 and 1a illustrate a typical wood pallet in a perspective and top view.
Figure 1A:
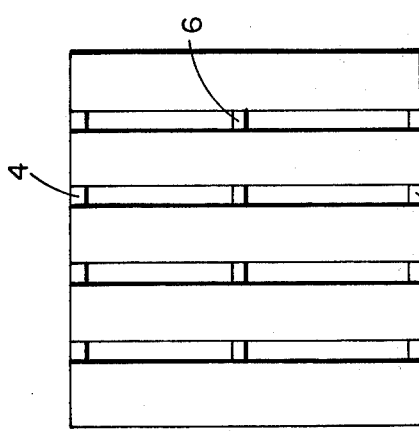

Referring now to FIG. 1 and 1a, there is illustrated the conventional type of wood pallet in commercial use. The pallet comprises the upper or deck boards 2 and the base boards 3, separated by end stringers 4 and 5 and intermediate stringer 6. The normal construction of the pallet permits the reversing of the upper and base boards for the deck.

In commercial use the pallet is subjected to rough usage by the fork lift, the material carried and the rough handling. In relatively short periods of time, one or more of the boards and/or stringers become damaged rendering the pallet unsafe for further use. Pallets to be used in commerce are made of oak or a similar hardwood. In view of the aging process the used boards are more valuable because of seasoning then the new or green lumber. Accordingly, it has been found profitable to salvage the undamaged lumber and to reconstruct the pallet. The manual disassembly job is laborious, tedious, costly, and time consuming, and what's more, many times results in further or additional damage to the lumber.

Figure 4:
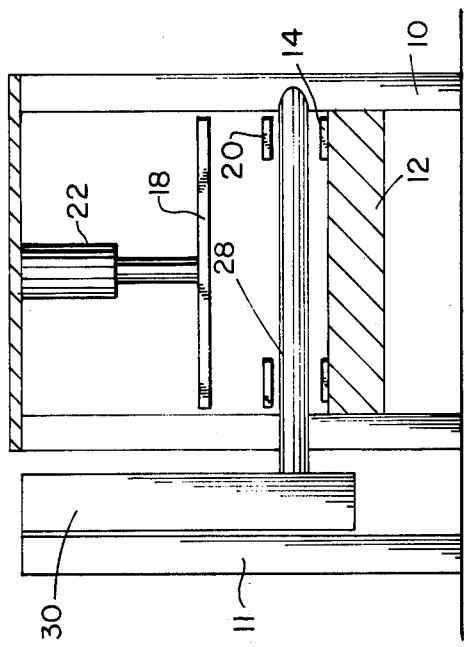
FIG. 4 is an end view of the illustration of FIG. 2 showing more explicitly the engaging arm.
Figure 3:
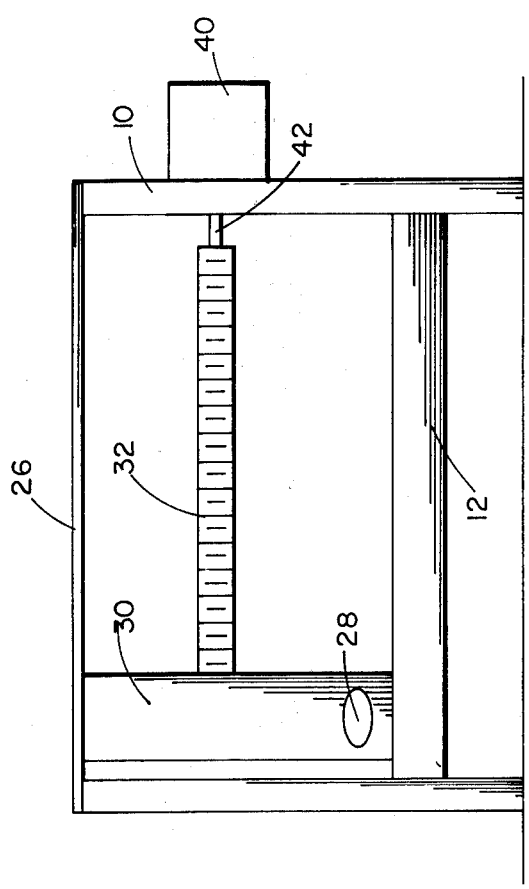
FIG. 3 illustrates the rearwardly positioned supporting bar for the laterally moving engaging arm.
Figure 2:
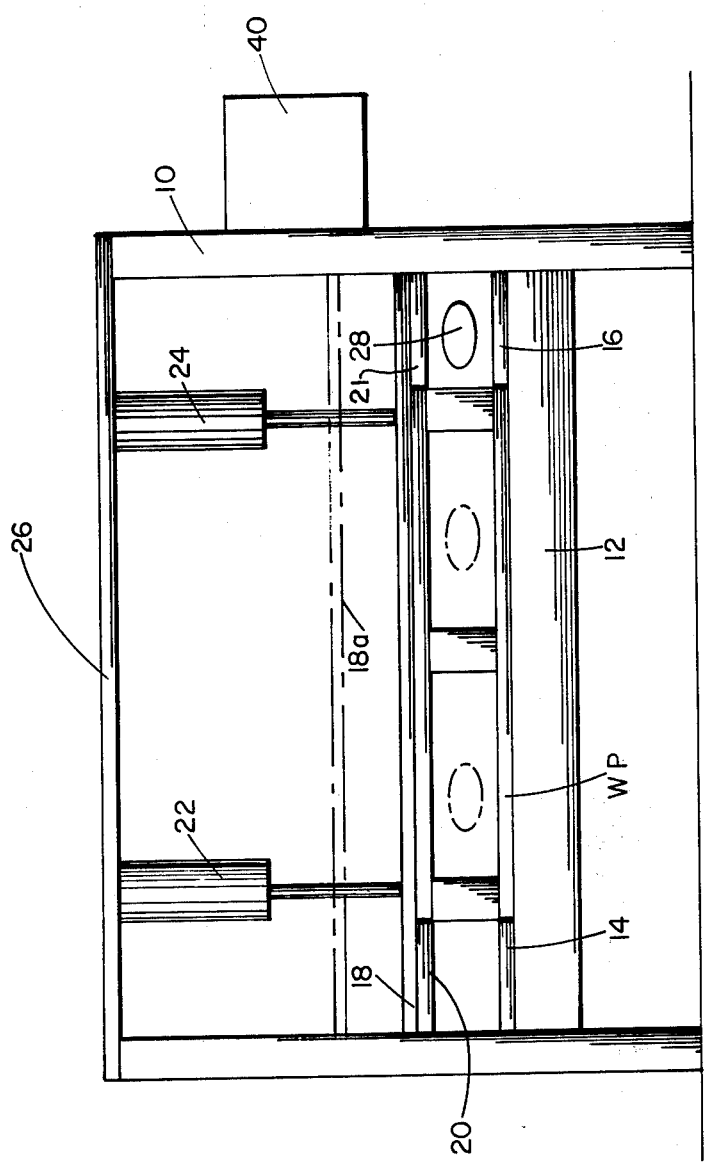
FIG. 2 is a front view illustration of the overall machine of the present invention.

With reference to FIGS. 2, 3, and 4, there is illustrated the machine of the present invention for disassembling a wood pallet to salvage the undamaged lumber. Basically the machine removes any one or all of the stringers from the upper and base boards without further damage to the lumber. The machine comprises the overall structure 10, platform 12, with lateral stop 14, upper plate 18, engaging arm 28, and its lateral moving means 32.

More specifically, the structure 10 is very heavy construction, and is in essence a supporting stand. The platform 12 is a table-like shelf approximately waist high. At the extreme left end of platform 12 is a lower stop-plate 14 and an upper stop-plate 20 and on the extreme right end is a lower stop-plate 16 and an upper stop-plate 21. The platform 12 is sufficiently large to receive the pallet workpiece. Movably positioned above the maximum height of the workpiece is the plate 18. This plate is moved vertically to engage and disengage the workpiece. Movement is accomplished by the lifting and lowering hydraulic cylinders 22 and 24. The plate 18 may be lowered to firmly and rigidly engage the workpiece, but not with sufficient force to change its structure. The purpose of the plate engaging the workpiece is to maintain the workpiece in position while it is being worked upon.

With reference also to the backview of FIG. 3, and the side view of FIG. 4, there is illustrated the engaging arm 28 and its attendant apparatus. The arm 28 supporting structures 30 and 11 are integral with the hydraulic rod 32 driven by the power source 40 through connecting means 42. Simply the arm 28 moves laterally and horizontally from one extreme side of the supporting structure to the opposite side. The arm 28 is positioned a height above the platform that is intermediate the height of the deck and base boards of the workpiece when resting on the platform 12.

In operation of the machine of the present invention, the power source 40 through lines 42 activates the hydraulic cylinder to transverse the engaging arm 28 to one side or the other of the structure 10. Assuming, in a first instance, that the three stringers are to be removed, the arm 28 would be moved to the extreme right—as shown in FIG. 2. The cylinders 22 and 24 are next activated to lower the plate 18 from its uppermost position 18a to retaining engagement with the pallet—again as shown in FIG. 2. The power source 40 is again activated, causing the engaging arm 28 to contact the first stringer along its entire length. As the engaging arm 28 continues to move laterally across the platform, the second stringer is contacted by the first removed stringer and then the third stringer is contacted. The three stringers continue to progress beyond the region of the base and deck boards and hence are removed therefrom. The plate 18 is then lifted and the boards and stringers are removed.

With the engaging arm in its most left position another pallet is placed on the platform and the same process is practiced except in a reverse direction.

In certain instances, it is not desired to remove all three stringers, perhaps only one or two depending on their condition. If less than three stringers are to be removed the engaging arm is moved—left or right depending on its initial position to be in a horizontal position above the platform adjacent the first stringer to be removed. If the stringer to be removed is the middle stringer, it may be removed and the engaging arm 28 continued to move and remove the end stringer or stopped depending on whether it is desired that the end stringer be removed.

The power source 40 must, of course, be of sufficient force to perform the necessary operation. It has been found in that the pallets are of hardwood and the nails are in most instances rusty, the power to effect the operation is substantial.

Prior to the machine of the present invention, the disassembling of the pallets was a hand operation. Even discounting the fact of additional damage, the time for hand labor was found to be 6 times that of the machine.

The nails holding the boards to the stringers remain in the board generally if the head of the nail is not destroyed, or in stringers if the head of the nail is destroyed. The lumber that is reuseable must have the old nails removed prior to reassembling. In that the wood is hard and the nails rusty and fragile, it has been found more expedient to torch off the remaining nails.

The destroyed lumber is disposed of and the undamaged lumber is reused in the reconstruction of the pallets.

Although a certain embodiment and construction of my machine has been shown and described, it is to be understood that modifications may be had thereto, without departing from the true spirit and scope of the invention.

What is claimed is:

1. A machine for disassembling wood pallets of the type having deck and base boards and stringers comprising a structure including:
   a platform for placing said pallet thereon;
   an engaging arm and means for positioning said arm above said platform at a height of said stringers;
   a shaft having said arm movably positioned thereon for movement of said arm laterally from one side of said structure to the other side;
   drive means for moving said arm to engage said stringers;
   a stop on said platform to restrict said pallet placed on said platform from lateral movement;
   a plate movable vertically to contact the upper deck to restrict said pallet from vertical movement when said arm is in engagement with said stringers.

2. The machine of claim 1 wherein said stop is on both sides of said platform to permit lateral contact with said pallet from either direction.

3. The machine of claim 1 wherein said lateral movement is controlled from any position between said structure, to thereby permit the removal of one, or more stringers from said pallet.

4. The machine of claim 1 wherein said shaft is a hydraulic arm and said movement is reciprocal movement.

5. The machine of claim 1 wherein said plate is of a size greater than the upper deck of said pallet.

6. The machine of claim 1 wherein said plate further comprises hydraulic means for moving said plate up and down.

* * * * *